(12) United States Patent
Aizawa et al.

(10) Patent No.: US 6,563,458 B2
(45) Date of Patent: May 13, 2003

(54) GPS RECEPTION SYSTEM

(75) Inventors: Tadashi Aizawa, Suwa (JP); Takeshi Nakajima, Matsumoto (JP); Teruyasu Hama, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/881,657

(22) Filed: Jun. 14, 2001

(65) Prior Publication Data

US 2002/0021244 A1 Feb. 21, 2002

(30) Foreign Application Priority Data

Jun. 15, 2000 (JP) ........................ 2000-179893

(51) Int. Cl.⁷ .................... G01S 5/14; H04B 7/185
(52) U.S. Cl. ................. 342/357.06; 342/374
(58) Field of Search ................ 342/357.06, 368, 342/374; 455/277.1, 276.1

(56) References Cited

U.S. PATENT DOCUMENTS

| | | | |
|---|---|---|---|
| 5,248,981 A | * | 9/1993 | Yoshihara et al. .......... 342/357 |
| 5,341,301 A | | 8/1994 | Shirai et al. |
| 6,009,335 A | * | 12/1999 | Murphy ........................ 455/562 |
| 6,069,583 A | * | 5/2000 | Silvestrin et al. ...... 342/357.01 |
| 6,154,170 A | * | 11/2000 | Dentinger et al. ........... 342/357 |
| 6,351,236 B1 | * | 2/2002 | Hasler .................... 342/357.09 |
| 2002/0044085 A1 | * | 4/2002 | Howell et al. ......... 342/357.06 |

FOREIGN PATENT DOCUMENTS

| | | |
|---|---|---|
| DE | 41 42 403 A1 | 5/1992 |
| JP | 55143/1985 | 4/1985 |
| JP | 88538/1989 | 6/1989 |
| JP | 04025781 A | 1/1992 |
| JP | 04225185 A | 8/1992 |
| JP | 06075035 A | 3/1994 |
| JP | 06194438 A | 7/1994 |
| JP | 06266908 A | 9/1994 |
| JP | 07057189 A | 3/1995 |
| JP | 08137905 A | 5/1996 |

* cited by examiner

Primary Examiner—Dao Phan
(74) Attorney, Agent, or Firm—Harness, Dickey & Pierce, P.L.C.

(57) ABSTRACT

A GPS reception system is provided in which, when sufficient reception level for positioning cannot be obtained only by a built-in antenna, a reception antenna is switched from the built-in antenna to an external antenna.

10 Claims, 5 Drawing Sheets

| ORDER OF RECEPTION LEVEL | PICKED UP SATELLITE | RECEPTION ANTENNA |
|---|---|---|
| 1 | SATELLITE A | EXTERNAL ANTENNA 8 |
| 2 | SATELLITE B | EXTERNAL ANTENNA 8 |
| 3 | SATELLITE A | BUILT-IN ANTENNA 3 |
| 4 | SATELLITE B | BUILT-IN ANTENNA 3 |
| 5 | SATELLITE C | BUILT-IN ANTENNA 3 |
| 6 | SATELLITE D | EXTERNAL ANTENNA 8 |
| 7 | SATELLITE E | EXTERNAL ANTENNA 8 |
| 8 | SATELLITE C | EXTERNAL ANTENNA 8 |
| ⋮ | ⋮ | ⋮ |

(b)

| PICKED UP SATELLITE | BUILT-IN ANTENNA 3 | EXTERNAL ANTENNA 8 |
|---|---|---|
| SATELLITE A |  | O |
| SATELLITE B |  | O |
| SATELLITE C | O |  |

GPS RECEPTION SYSTEM

TECHNICAL FIELD

The present invention relates to a GPS reception system which receives radio waves emitted from a GPS satellite and carries out positioning.

BACKGROUND OF THE INVENTION

In recent years positioning systems making use of GPS (Global Positioning System) technology have been widely used in car navigation systems and for geographic surveys. Recently, GPS receivers have been formed integrally with personal computers and in addition to their map navigation function, their use as portable communication tools provided with, a PDA (Personal Data Assist) function, a camera function, a communication function with a linkage to a portable telephone etc., and the like is spreading.

In such a portable GPS system, a GPS receiver which receives radio waves emitted from a GPS satellite, and a processing unit for decoding a received signal and carrying out an arithmetic operation for calculating position information are provided as one integrated structure. An antenna for receiving a radio wave emitted from the GPS satellite is contained in the GPS receiver.

Providing an antenna within the GPS receiver makes it convenient in portability, handling and the like. On the other hand, however, the receiver can not be always located at a place where a sufficient reception level can be provided for positioning. For example, when being used in a vehicle, there have been problems wherein the radio waves emitted from the GPS satellite were obstructed by the body of the vehicle making it difficult to ensure good reception conditions.

The GPS system adopts a spread spectrum method to make the system less susceptible to the influence of multi-path fading. However, differences in the direction of arrival of the emitted radio waves for each of GPS satellites cause an additional problem in that positioning accuracy is affected in a strong multipath fading environment.

The present invention was made for solving the above problems with an object of ensuring a higher reception performance. For this, another external antenna is separately provided from the built-in antenna so that it can be connected to the GPS receiver. The built-in antenna is switched to the external antenna when a sufficient reception level for positioning cannot be obtained using only the built-in antenna.

SUMMARY OF THE INVENTION

The present invention is provided for achieving the above object. The invention according to one embodiment is a GPS reception system comprising a GPS receiver having a built-in antenna and an external antenna made connectable to the GPS receiver, which system comprises an antenna switching unit which switches between the built-in antenna and the external antenna, and, when the external antenna is connected to the GPS receiver, switching a receiving antenna from the built-in antenna to the external antenna.

According to such a GPS reception system, the external antenna is used when a sufficient reception level cannot be obtained with only the built-in antenna, making it possible to obtain positioning data and to ensure higher reception levels.

The invention according to another embodiment is a GPS reception system which comprises an antenna switching circuit which, when the external antenna is connected to the GPS receiver, detects the connection of the external antenna by detecting the current consumed in the external antenna in order to drive a changeover switch.

According to such a GPS reception system, it becomes possible to switch from the built-in antenna to the external antenna by a simple circuit configuration.

The invention according to yet another embodiment is an antenna switching unit in which the antenna switching circuit comprises a current detecting resistor which is inserted in a power supply line of the external antenna, a comparator which detects a change in a voltage generated across both ends of the current detecting resistor by the consumed current, and a changeover switch driven by an output control signal of the comparator.

According to such a GPS antenna switching unit, it becomes possible to carry out switching from the built-in antenna to the external antenna by a simple and inexpensive circuit configuration.

The invention according to still yet another embodiment is an antenna switching circuit which is configured such that the antenna switching circuit is supplied with two different power supply voltages, of which a first power supply voltage is supplied as a power supply voltage of the comparator, and a second power supply voltage supplies as a voltage, which is set lower than the first power supply voltage, to the power supply line of the external antenna.

According to such an antenna switching unit, it becomes possible to carry out switching from the built-in antenna to the external antenna with a circuit configuration which is inexpensive yet stable in operation without using an expensive comparator such as a rail-to-rail type. Moreover, the second power supply voltage is obtained with the first power supply voltage regulated by a regulator. Thus, it becomes possible to supply a voltage with few ripples and high voltage accuracy.

The invention according to another embodiment is a GPS reception system which has a configuration such that the antenna switching unit comprises a switch which is inserted through a connector for connecting of the external antenna to the GPS receiver, and which switches the reception antenna from the built-in antenna to the external antenna when the external antenna is connected to the GPS receiver.

According to such a GPS reception system, it becomes possible to carry out switching from the built-in antenna to the external antenna without using an antenna switching circuit which uses a switching element, a comparator and the like by simply detecting connection of the external antenna.

The invention according to yet another embodiment is a GPS reception system comprising a GPS receiver having a built-in antenna and an external antenna made connectable to the GPS receiver, which system comprises a reception level detecting unit which measures a reception level of the built-in antenna and that of the external antenna and compares the measured reception levels with each other; and an antenna switching control unit which selects a reception antenna from the measurement and comparison results of the reception levels obtained in the reception level detecting unit, carries out control of switching between the built-in antenna and the external antenna, and carries out diversity reception with the built-in antenna and the external antenna.

According to such a GPS reception system, when a sufficient reception level cannot be obtained using only the built-in antenna, switching is carried out therefrom to the external antenna as appropriate. Therefore, it becomes possible to ensure higher reception performance compared with a GPS reception system with only the built-in antenna.

The invention according to still yet another embodiment is a GPS reception system having a configuration wherein the diversity reception measures reception levels of radio waves emitted from three or more specified GPS satellites for both the built-in antenna and the external antenna, compares the measured reception levels with one another, and selects the antenna from which the highest reception level was obtained as the reception antenna.

According to such a GPS reception system, it becomes possible to obtain positioning data necessary for two dimensional positioning (latitude, longitude) with high reception performance.

The invention according to another embodiment is a GPS reception system which has a configuration wherein the diversity reception periodically carries out switching between the built-in antenna and the external antenna, and selects the antenna from which a higher reception level is obtained as the reception antenna.

According to such a GPS reception system, the antenna with the higher reception level is selected each time. Thus, it becomes possible to always ensure high reception performance.

The invention according to yet another embodiment is a GPS reception system comprising a GPS receiver having a built-in antenna and an external antenna which can be connected to the GPS receiver, which system comprises a reception level detecting unit which measures the reception level of the built-in antenna and that of the external antenna and compares the measured reception levels with each other, and an antenna switching control unit which selects a reception antenna from the measurement and comparison results of the reception levels obtained in the reception level detecting unit and performs control of the switching between the built-in antenna and the external antenna, and, of the built-in antenna or the external antenna, designating the antenna which provides a higher reception level as the reception antenna for each of GPS satellites picked up.

According to such a GPS reception system, the antenna which provides a higher reception level is designated to the of GPS satellites each having arriving radio waves having different directions. Thus, it becomes possible to ensure further higher reception performance.

BEST MODE FOR CARRYING OUT THE INVENTION

Figure 1:
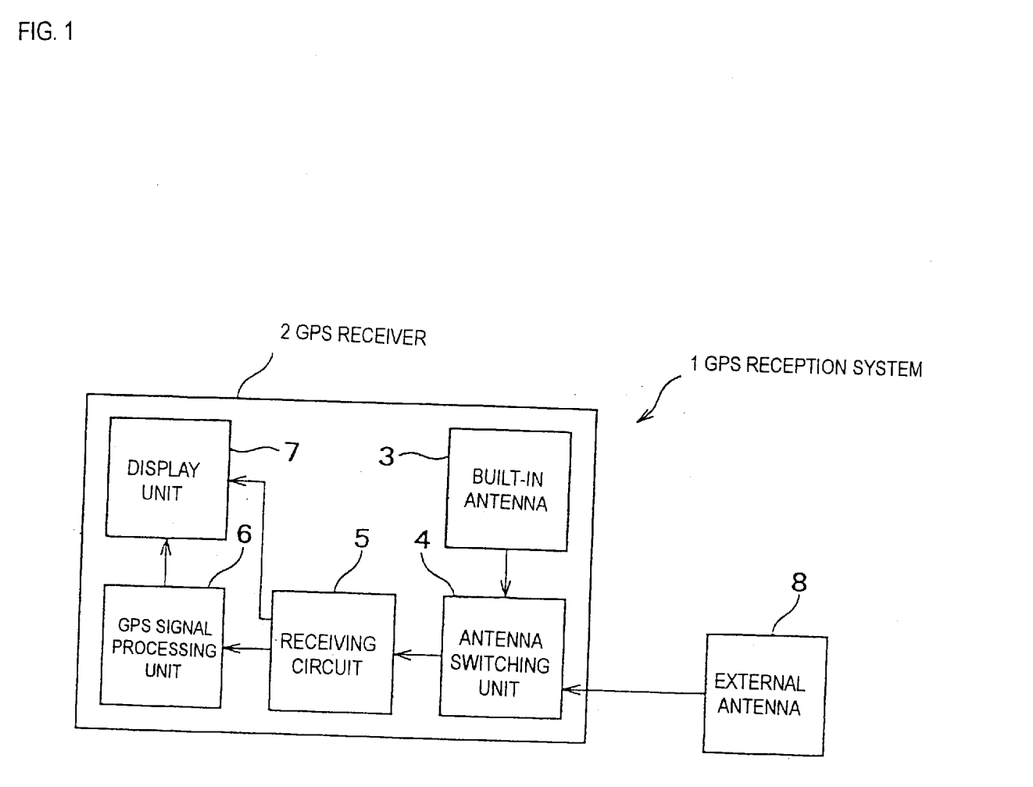
FIG. 1 is a block configuration diagram of a GPS reception system in which a reception antenna is switched from a built-in antenna to an external antenna when the external antenna is connected.

An explanation will be made first about a GPS reception system with reference to FIG. 1, in which system, when an external antenna is connected to a GPS receiver, a reception antenna is switched from a built-in antenna to the external antenna. FIG. 1 is a block configuration diagram showing a schematic configuration of the GPS reception system.

In FIG. 1, the GPS reception system 1 comprises a GPS receiver 2 and an external antenna 8. The GPS receiver 2 further comprises a built-in antenna 3, an antenna switching unit 4, a receiving circuit 5, a GPS signal processing unit 6, and a display unit 7.

Here, the built-in antenna 3 is an antenna receiving radio waves emitted from a GPS satellite and is contained in the GPS receiver 2. The external antenna 8 has the same antenna element structure as that of the built-in antenna 3 and can be connected to the GPS receiver 2 with a connection cable. The antenna switching unit 4 switches between the built-in antenna 3 and the external antenna 8. The receiving circuit 5 demodulates data received by the built-in antenna 3 or the external antenna 8. The GPS signal processing unit 6 converts a signal demodulated in the receiving circuit 5 to positioning data and carries out an arithmetic operation for calculating positional information. The display unit 7 is a unit for displaying reception conditions of the reception antenna and may be used as a monitoring screen for map information and the like.

If, while using the built-in antenna 3, the reception level deteriorates to a reception level insufficient for positioning, "the external antenna necessary" is indicated on the display unit 7. The display may be an illumination of an LED indicator light or the like, or sounding of a beep or the like. When the display "external antenna necessary" is displayed, the user of the GPS reception system 1 connects the external antenna 8 to the GPS receiver 2.

The display, "external antenna necessary," is not always necessary when carrying out switching from the built-in antenna 3 to the external antenna 8.

On connection of the external antenna 8 to the GPS receiver 2, a consumed current flows in a power supply line of the external antenna 8. By detecting the consumed current, it can be determined whether it is in a state where the external antenna 8 is connected or not.

Here, by forming the antenna switching unit 4 of an antenna switching circuit such that a switching element such as a switching IC, a PIN diode, or the like operates when the current consumed in the external antenna 8 is detected, it becomes possible to switch the reception antenna from the built-in antenna 3 to the external antenna 8.

As an embodiment of the above described antenna switching circuit, an antenna switching circuit using a comparator (a voltage comparator) will be explained with reference to FIG. 2.

Figure 2:
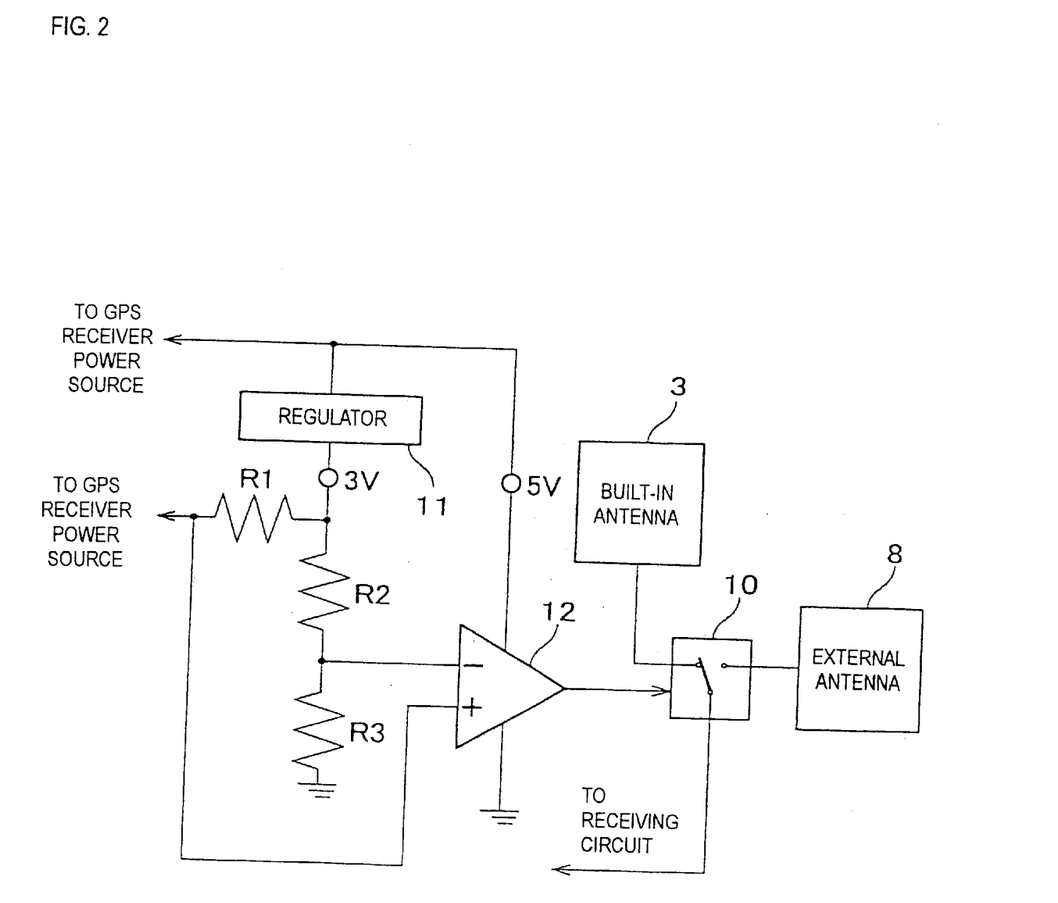
FIG. 2 is a switching circuit diagram of an antenna switching unit.

In FIG. 2, a current detecting resistor R1 is inserted in the power supply line of the external antenna 8. In the antenna switching circuit, two different power supply voltages are supplied. A first power supply voltage is supplied as the power supply voltage of a comparator 12, for which a power supply voltage (5V) of the GPS receiver 2 is used. A second power supply voltage is supplied to a negative input terminal of the comparator 12 by dividing a voltage (3V), which has been regulated from a power supply voltage for the GPS receiver 2 (5V) by a regulator 11, by a resistor R2 and a resistor R3, both for voltage regulation.

A changeover switch 10 is provided on an output terminal side of the comparator 12. The output signal level of the comparator 12 is made as a switching control signal for the changeover switch 10 to control the switching operation of the changeover switch 10.

When the external antenna 8 is connected to the GPS receiver 2, a consumed current flows in the power supply line of the external antenna 8. As a result of this consumed current, a voltage is generated across both ends of the current detecting resistor R1. At this time, an input voltage of a positive input terminal of the comparator 12 is reduced in potential by the voltage generated across both ends of the current detecting resistor R1.

The comparator 12 detects the change in the voltage to bring an output signal to a high level when the voltage at the positive input terminal becomes lower than the voltage at the negative input terminal. When the output signal of the comparator 12 is brought to a high level, the changeover switch 10 is switched from the side of the built-in antenna 3 to the side of the external antenna 8.

Here, for an stable switching operation, it is desirable to cause the largest possible difference in the voltage generated across both ends of the current detecting resistor R1 by the consumed current of the external antenna 8, depending on the presence or absence of the comparator 12 and an error in the current detecting resistor value are taken into account.

However, except for a comparator such as a rail-to-rail type which has a wide input voltage range, the maximum input voltage applied to the positive input terminal of the comparator 12 becomes smaller than the power supply voltage (5V) by a fixed value (for example, 1V). This makes it impossible for the comparator 12 to detect a change in voltage due to the consumed current of the external antenna 8 when the voltage generated across both ends of the current detecting resistor R1 is as small as 0.1V to an effective input voltage range (5V–1V).

Here, as shown in FIG. 2, the first power supply voltage (5V) is supplied as a power supply voltage of the comparator 12, and the second power supply voltage is set at a voltage lower than the first power supply voltage (3V) and is supplied to the power supply line of the external antenna 8. This makes it possible for the comparator 12, even when the voltage generated across both ends of the current detecting resistor R1 is as small as 0.1V, to detect the voltage change.

Therefore, an antenna switching circuit with a stable operation having an inexpensive comparator can be configured without using an expensive comparator such as the rail-to-rail type.

In addition, the first power supply voltage (5V) and the second power supply voltage (3V) supplied to the antenna switching circuit use the power supply voltage of the GPS receiver 2 and a voltage for which the power supply voltage is regulated, respectively. Hence, the existing power supply voltage can be effectively utilized without requiring any new power supply circuit.

Furthermore, the second power supply voltage is required to be a voltage with fewer ripples and a high voltage accuracy, for which a high quality voltage can be obtained by regulating the first power supply voltage with the regulator.

In the embodiment, the first power supply voltage and the second power supply voltage supplied to the comparator 12 were taken as 5V and 3V, respectively. The voltage values, however, are not limited to 5V and 3V, but may be two different voltages that allow the comparator 12 to detect a change in the voltage generated across both ends of the current detecting resistor R1.

Next, although the above antenna switching unit 4 is formed of an electrical switch, it can also be formed of a mechanical switch. An explanation of an embodiment of the mechanical switch will be made with reference to FIG. 3.

Figure 3:
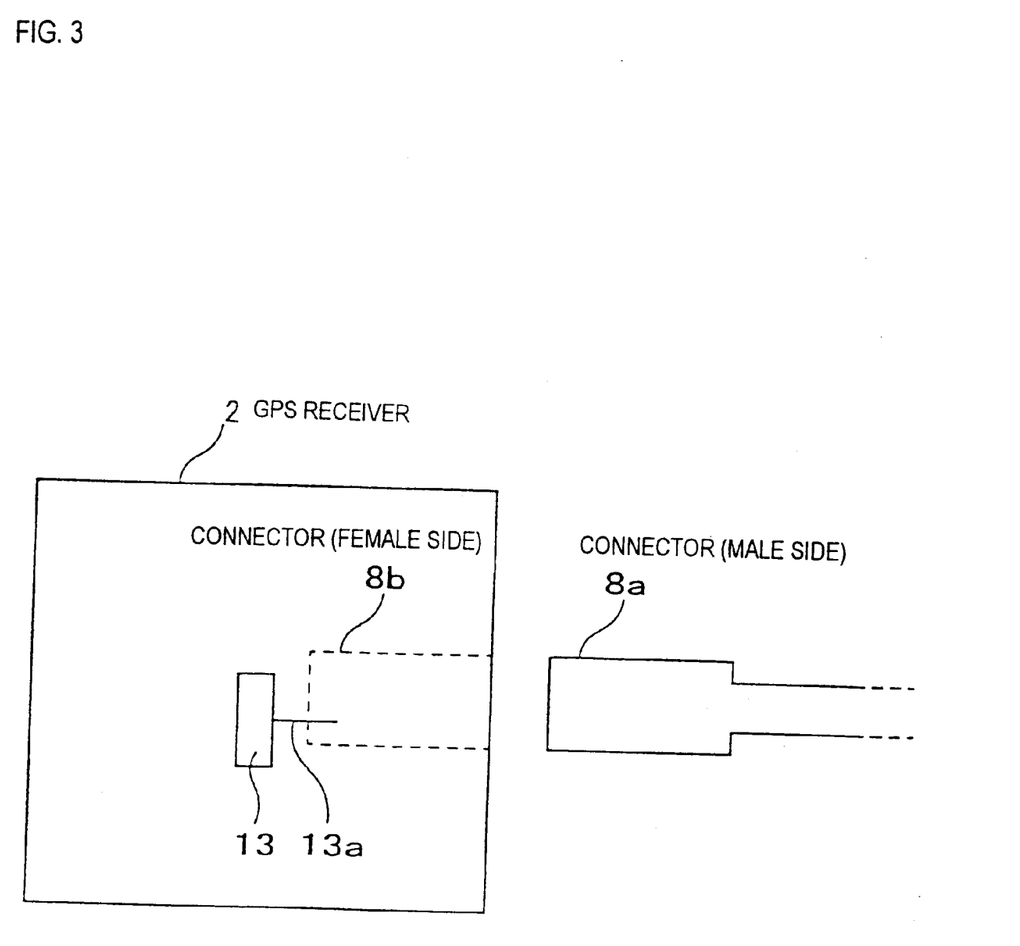
FIG. 3 is an explanatory diagram of a switch which detects connection of the external antenna in order to carry out switching from the built-in antenna to the external antenna.

In FIG. 3, reference numeral 8a denotes a male side of a connector for connecting the external antenna 8 and reference numeral 8b denotes a female side thereof. The female side 8b of the connector is attached to the GPS receiver 2.

Reference numeral 13 denotes a switch that switches the reception antenna from the built-in antenna 3 to the external antenna 8, both shown in FIG. 1, upon detecting that the external antenna 8 has been connected to the GPS receiver 2. The switch 13 is attached so that a projection 13a thereof is inserted through a part such as a shell of the female side 8b of the connector. On fitting the male side 8a of the connector of the external antenna 8 to the female side 8b, the projection 13a is pushed by and made to come into contact with the male side 8a of the connector to operate the switch 13. This breaks the connection between the built-in antenna 3 and the receiving circuit 5 to connect the external antenna 8 to the receiving circuit 5.

Here, for the switch 13a photodetecting element may be used. In this case, with the photodetecting element attached to, for example, the female side 8b of the connector of the external antenna 8, the switch 13 is configurated so that, when the male side 8a of the connector fits to the female side 8b, light is intercepted to operate the switch 13.

Figure 4:
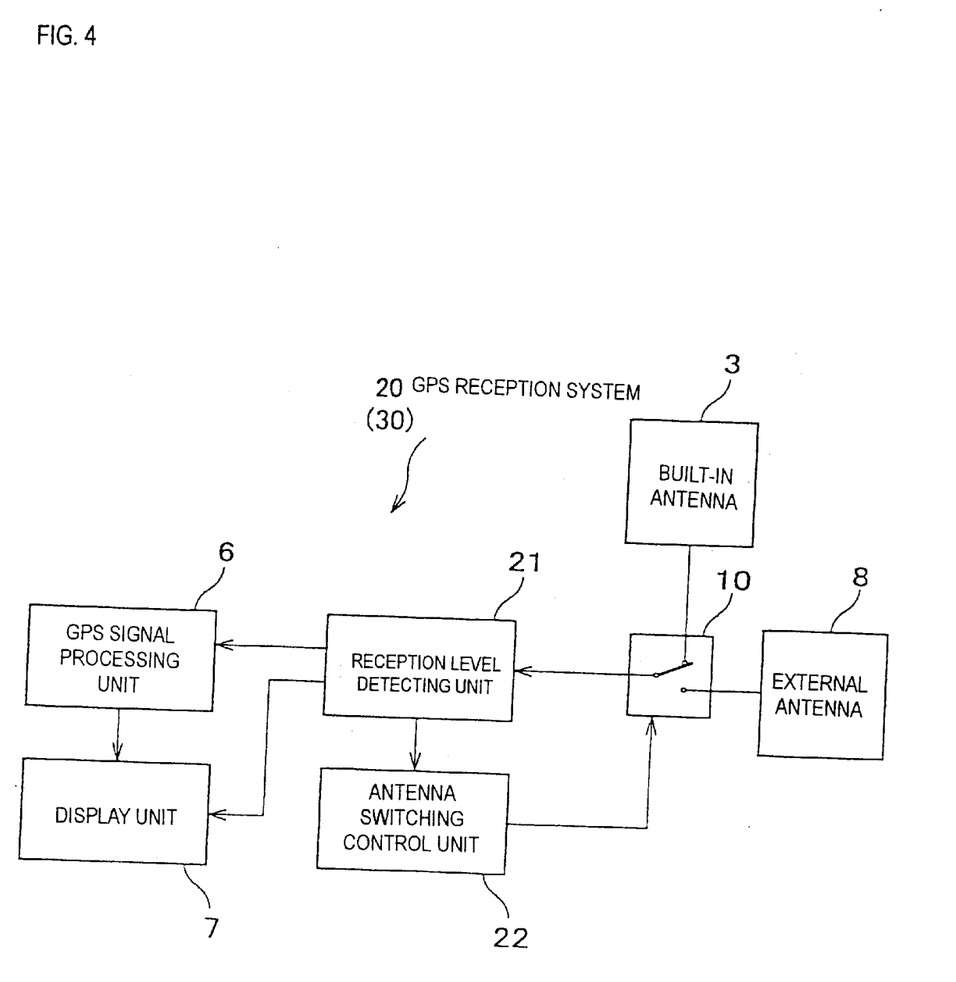
FIG. 4 is a block configuration diagram of a GPS reception system carrying out diversity reception.

Next, an explanation will be made with reference to FIG. 4 about a GPS reception system which carries out diversity reception by using both the built-in antenna and the external antenna. FIG. 4 is a block configuration diagram showing a schematic configuration of the GPS reception system carrying out the diversity reception.

In FIG. 4, a reception level detecting unit 21 measures reception levels of the reception antennas (the built-in antenna 3, the external antenna 8) and compares them. An antenna switching control unit 22 selects the reception antenna from the reception levels measured and compared in the reception level detecting unit 21 to output a control signal for switching the reception antenna to the changeover switch 10. The changeover switch 10 switches the reception antenna to the built-in antenna 3 or the external antenna 8 depending on the control signal from the antenna switching control unit 22. The display unit 7 is a unit for displaying reception conditions of the reception antenna and may also be used as a monitoring screen for map information and the like.

If, while using the built-in antenna 3, the reception level deteriorates to a reception level unsufficient for positioning, "external antenna necessary," is indicated on the display unit 7. The display may be illumination of an LED indicator light the like, or sounding of a beep or the like. A user of a GPS reception system 20, when the display of the "the external antenna is necessary" is displayed, connects the external antenna 8 to the GPS receiver 2.

The display, "external antenna necessary," is not always necessary when carrying out diversity reception.

When the external antenna 8 is connected to the GPS receiver 2, the antenna switching control unit 22 periodically outputs control signals for switching the reception antenna to the changeover switch 10. When the changeover switch 10 is switched to the side of the built-in antenna 3, the reception level detecting unit 21 measures the reception level of the built-in antenna 3. Subsequently, when the changeover switch 10 is switched to the side of the external antenna 8, the reception level detecting unit 21 also measures the reception level of the external antenna 8 in the same way.

The reception level detecting unit 21 compares reception levels measured by both antennas and selects the antenna from which a higher reception level is obtained. The antenna switching control unit 22 outputs to the changeover switch 10a control signal for switching to the side of the selected antenna, and the changeover switch 10 is switched to the side of the selected antenna.

By carrying out a diversity reception in this way, when a sufficient reception level is not obtained only by the built-in antenna 3, switching to the external antenna 8 is carried out as appropriate. It thus becomes possible for the GPS reception system 20 in the embodiment to ensure a high reception performance compared with the GPS reception system 1 configured with the built-in antenna 3 only.

In addition, even in the case where the external antenna 8 is not always able to provide a reception level higher than that of the built-in antenna 3 because of the location where the GPS receiver 2 is positioned, the antenna with a higher reception level is selected as the reception antenna by successively switching antennas. This makes it possible to always ensure high reception performance.

Here, the above diversity reception measures reception levels of radio waves emitted from three or more specified GPS satellites about each of the built-in antenna 3 and the external antenna 8, and selects the antenna from which the highest reception level was obtained as the reception antenna.

This makes it possible to obtain positioning data necessary for two dimensional positioning (latitude, longitude) with high reception performance.

Figure 5:
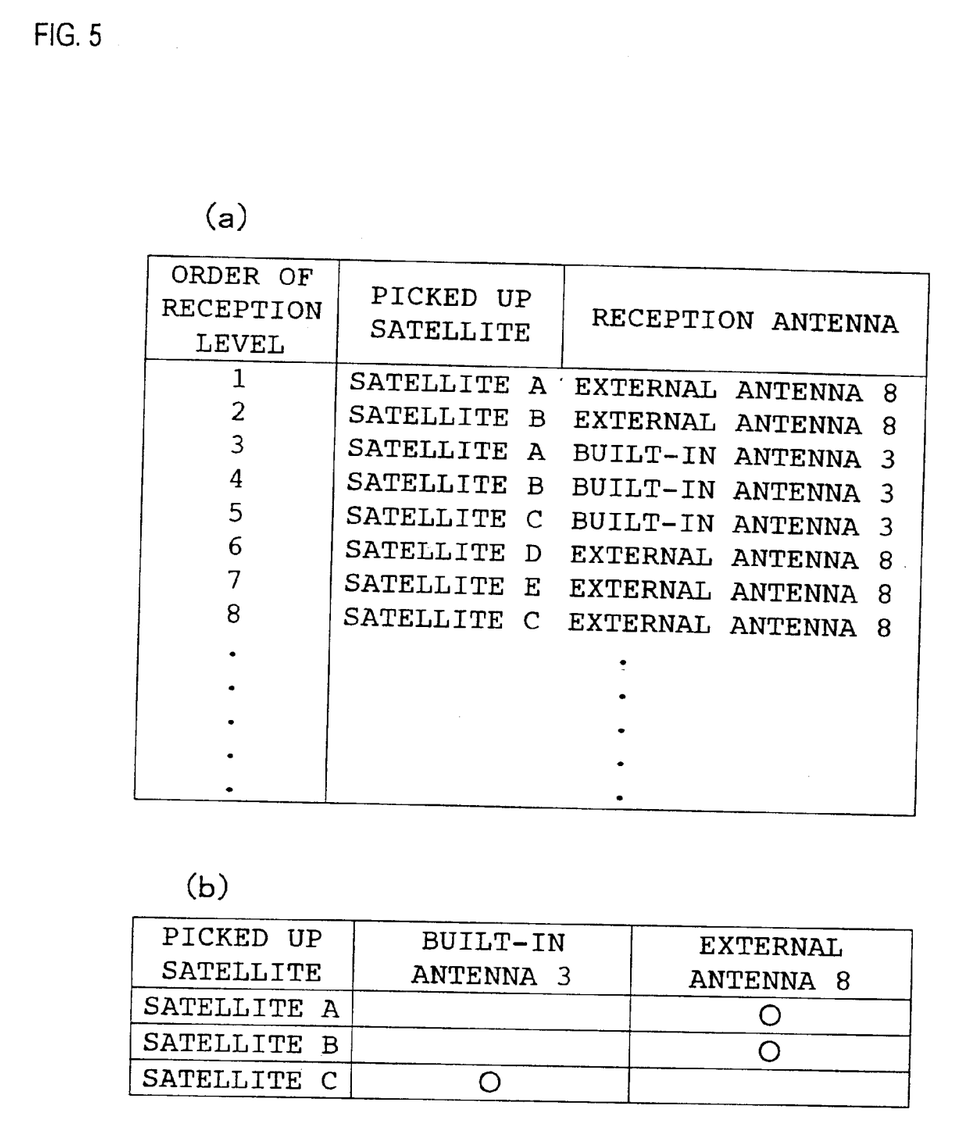
FIG. 5 is an explanatory diagram of antenna designation in a GPS reception system in which reception antennas are designated to respective GPS satellites, in which (a) is an explanatory diagram showing order of reception levels of reception antennas and (b) is an explanatory diagram showing designation of the reception antennas.

Next, an explanation will be made with reference to FIG. 4 and FIG. 5 about a GPS reception system in which, of the built-in antenna or the external antenna, the antenna that provides a higher reception level is designated as the reception antenna for each of GPS satellites picked up. FIG. 4 is a block configuration diagram showing a schematic configuration of such a GPS reception system. The configuration thereof is similar to that of the GPS reception system 20 that carries out the diversity reception. Moreover, FIG. 5 is an explanatory diagram of antenna designation in such a GPS reception system. FIG. 5(a) is an explanatory diagram showing the order of reception levels of the reception antennas, and FIG. 5(b) is an explanatory diagram showing designation of reception antennas.

In a GPS reception system 30 shown in FIG. 4, the antenna switching control unit 22 controls the changeover switch 10 to alternately switch between the built-in antenna 3 and the external antenna 8.

The reception level detecting unit 21 extracts, from the reception level measured, a specified number of GPS satellites according to the order of their reception level. Then, from the extracted specified number of GPS satellites, the antenna switching control unit 22 designates antennas with higher reception levels as reception antennas.

For example, in FIG. 5(a), the satellite A, the satellite B and the satellite C are extracted as the top three satellites which the highest reception levels. Since the reception level of the satellite A is higher with the external antenna 8 than with the built-in antenna 3, the external antenna 8 as shown in FIG. 5(b) is designated as the reception antenna for the satellite A. In the same way, the external antenna 8 and the built-in antenna 3 are designated to the satellite B and the satellite C.

By designating the reception antenna for each GPS satellite in this way, it becomes possible to capture the radio waves with the highest reception levels using GPS satellites wherein the radio waves from different directions.

The above described embodiments are explanatory and the scope of the present invention is not limited thereto. Therefore, those skilled in the art can adopt embodiments in which each or every element in the above embodiments is substituted by elements equivalent thereto, while still being included within the scope of the present invention.

For example, the form of the GPS reception system can be a vehicle-mounted type, a portable type, a combination type of a PC card and a personal computer, or the like applicable to various GPS reception systems.

As explained in the foregoing, according to the present invention, the following effects can be exhibited.

(1) With a configuration in which the external antenna is connected and the reception antenna is switched from the built-in antenna to the external antenna, it becomes possible to obtain positioning data with higher reception levels being ensured by carrying out switching from the built-in antenna to the external antenna when a sufficient reception level can not be obtained only by the built-in antenna.

(2) With the antenna switching unit being made as an antenna switching circuit that detects a consumed current flowing when the external antenna is connected to drive a changeover switch, it becomes possible to carry out switching from the built-in antenna to the external antenna by a simple circuit configuration.

(3) With a configuration in which the antenna switching circuit comprises a current detecting resistor inserted in a power supply line of the external antenna, a comparator detecting a change in a voltage generated across both ends of the current detecting resistor by the consumed current flowing in the external antenna, and a changeover switch driven by an output control signal of the comparator, it becomes possible to perform switching from the built-in antenna to the external antenna by using a simple and inexpensive circuit configuration.

(4) With the antenna switching circuit, which is configured so that the antenna switching circuit is supplied with two different power supply voltages, wherein the first power supply voltage is supplied as the power supply voltage of the comparator, and a second power supply voltage is set at a voltage lower than the first power supply voltage to be supplied to the power supply line of the external antenna, it becomes possible to carry out switching from the built-in antenna to the external antenna with a circuit configuration which is inexpensive yet stable in operation without using an expensive comparator such as a rail-to-rail type. Moreover, the second power supply voltage is obtained with the first power supply voltage regulated by a regulator. Thus, it becomes possible to supply a voltage with few ripples and high voltage accuracy.

(5) With the antenna switching unit configured for switching from the built-in antenna to the external antenna when a switch inserted through a connector for connection of the external antenna detects connection of the external antenna, it becomes possible to simply carry out a switching from the built-in antenna to the external antenna without using an antenna switching circuit which uses a switching element, a comparator and the like.

(6) With a configuration wherein diversity reception is carried out with the built-in antenna and the external antenna, it becomes possible to ensure higher reception performance than attained with a GPS reception system configured only with the built-in antenna.

(7) With the a configuration wherein the diversity reception measures reception levels of radio waves emitted from three or more specified GPS satellites for each of the built-in antenna and the external antenna, compares the measured reception levels with one another, and selects the antenna from which the highest reception level is obtained, as the reception antenna, it becomes possible to obtain the positioning data necessary for two dimensional positioning (latitude, longitude) with high reception performance.

(8) With a configuration wherein the diversity reception periodically carries out switching between the built-in antenna and the external antenna, and selects an antenna from which a higher reception level is obtained, it becomes possible to always ensure high reception performance.

With configuration wherein, of the built-in antenna or the external antenna, the antenna which provides a higher reception level is designated as the reception antenna for each of GPS satellites picked up, it becomes possible to ensure even better reception performance where radio waves emitted from GPS satellites have different directions of arrival. The entire disclosure of Japanese Patent Application 2000-179893, filed Jun. 15, 2000, is incorporated herein by reference.

What is claimed is:

1. A GPS reception system including a GPS receiver having a built-in antenna and an external antenna made connectable to the GPS receiver, the system comprising an antenna switching unit which switches between the built-in antenna and the external antenna, wherein the antenna switching unit is adapted to detect when the external antenna is connected to the GPS receiver and thereafter switch a receiving antenna from the built-in antenna to the external antenna.

2. The GPS reception system as claimed in claim 1 characterized in that the antenna switching unit comprises an antenna switching circuit which, when the external antenna is connected to the GPS receiver, detects the connection of the external antenna by detecting consumption of current in the external antenna to drive a changeover switch.

3. The GPS reception system as claimed in claim 2 characterized in that the antenna switching circuit comprises a current detecting resistor which is inserted in a power supply line of the external antenna, a comparator which detects a change in a voltage generated across both ends of the current detecting resistor by the current consumption, and a changeover switch driven by an output control signal of the comparator.

4. The GPS reception system as claimed in claim 3 characterized in that the antenna switching circuit is supplied with two different power supply voltages, of which a first power supply voltage is supplied as a power supply voltage of the comparator, and a second power supply voltage supplies a voltage, which is set lower than the first power supply voltage, to the power supply line of the external antenna.

5. The GPS reception system as claimed in claim 1 characterized in that the antenna switching unit comprises a switch which is inserted through a connector for connecting the external antenna to the GPS receiver, and which switches the reception antenna from the built-in antenna to the external antenna when the external antenna is connected to the GPS receiver.

6. A GPS reception system comprising a GPS receiver having a built-in antenna and an external antenna made connectable to the GPS receiver, the system characterized by comprising a reception level detecting unit which measures a reception level of the built-in antenna and that of the external antenna and compares the measured reception levels with each other, and an antenna switching control unit which selects a reception antenna from measurement and comparison results of the reception levels obtained in the reception level detecting unit and carries out control of switching between the built-in antenna and the external antenna, and carrying out diversity reception with the built-in antenna and the external antenna.

7. The GPS reception system as claimed in claim 6 characterized in that the diversity reception measures reception levels of radio waves emitted from specified GPS satellites about each of the built-in antenna and the external antenna, compares the measured reception levels with one another, and selects an antenna, from which the highest reception level is obtained, as the reception antenna.

8. The GPS reception system as claimed in claim 6 characterized in that the diversity reception periodically carries out switching between the built-in antenna and the external antenna, and selects an antenna, from which a higher reception level is obtained, as the reception antenna.

9. A GPS reception system including a GPS receiver having a built-in antenna and an external antenna made connectable to the GPS receiver, the system characterized by comprising a reception level detecting unit which measures a reception level of the built-in antenna and that of the external antenna and compares the measured reception levels with each other, and an antenna switching control unit which selects a reception antenna from measurement and comparison results of the reception levels obtained in the reception level detecting unit and carries out control of switching between the built-in antenna and the external antenna, and, of the built-in antenna or the external antenna, designating an antenna which provides a higher reception level as the reception antenna for each of the GPS satellites picked up.

10. The GPS reception system as claimed in claim 1 further comprising a reception level detecting unit which measures a reception level of the built-in antenna and that of the external antenna and compares the measured reception levels with each other, and the antenna switching unit selects the receiving antenna from the measurement and comparison results of the reception levels obtained in the reception level detecting unit.

* * * * *

UNITED STATES PATENT AND TRADEMARK OFFICE
CERTIFICATE OF CORRECTION

PATENT NO. : 6,563,458 B2
DATED : May 13, 2003
INVENTOR(S) : Aizawa et al.

It is certified that error appears in the above-identified patent and that said Letters Patent is hereby corrected as shown below:

Column 3,
Line 40, delete "of";

Column 5,
Line 16, "an" should be -- a --;

Column 6,
Line 18, "switch 13a" should be -- switch 13 a --;
Line 48, after "light" insert -- or --;

Column 7,
Line 3, "switch 10a" should be -- switch 10, a --;
Line 55, delete "which" and substitute -- with -- therefor;

Column 8,
Line 63, delete "the".

Signed and Sealed this

Eighteenth Day of November, 2003

JAMES E. ROGAN
*Director of the United States Patent and Trademark Office*